(12) United States Patent
Sutariya (10) Patent No.: US 10,175,090 B2
(45) Date of Patent: Jan. 8, 2019

(54) WEIGHTING APPARATUS INCORPORATING A FREELY SUPPORTED CONTAINER

(71) Applicant: Jensen USA Inc., Panama City, FL (US)

(72) Inventor: Jignesh Kalidas Sutariya, Panama City, FL (US)

(*) Notice: Subject to any disclaimer, the term of this patent is extended or adjusted under 35 U.S.C. 154(b) by 165 days.

(21) Appl. No.: 15/178,590

(22) Filed: Jun. 10, 2016

(65) Prior Publication Data
US 2017/0356789 A1  Dec. 14, 2017

(51) Int. Cl.
*G01G 3/14* (2006.01)
*G01G 23/01* (2006.01)
*G01G 21/28* (2006.01)
*G01G 19/52* (2006.01)

(52) U.S. Cl.
CPC .......... *G01G 3/1402* (2013.01); *G01G 23/01* (2013.01); *G01G 19/52* (2013.01); *G01G 21/28* (2013.01)

(58) Field of Classification Search
CPC .... G01G 3/1402; G01G 3/1412; G01G 19/52; G01G 21/28; G01G 23/01–23/017
See application file for complete search history.

(56) References Cited

U.S. PATENT DOCUMENTS

| | | | | |
|---|---|---|---|---|
| 1,520,372 A * | 12/1924 | Syers | ..................... | G01G 19/00 177/160 |
| 1,749,746 A * | 3/1930 | Guldbrandsen | ........ | G01G 19/00 177/160 |
| 4,466,500 A * | 8/1984 | Mosher | ................ | G01G 19/393 177/1 |
| 5,058,422 A * | 10/1991 | Shimauchi | ........... | G01G 23/012 177/25.11 |
| 5,629,498 A * | 5/1997 | Pollock | .................. | G01G 17/04 177/126 |
| 5,641,947 A * | 6/1997 | Riddle, Jr. | ................ | B65F 1/06 177/124 |
| 6,792,371 B1 * | 9/2004 | Turner | .................... | G01G 23/01 177/50 |
| 8,944,249 B1 * | 2/2015 | Mullaney | .................. | B65F 1/14 177/144 |
| 8,963,025 B2 * | 2/2015 | Pollock | ................ | G01G 19/387 177/15 |
| 9,347,821 B1 * | 5/2016 | Mullaney | ............... | G01G 19/62 |
| 2004/0031626 A1 * | 2/2004 | Morris | ................. | G01G 19/414 177/25.17 |

(Continued)

FOREIGN PATENT DOCUMENTS

DE  10237513 A1  3/2004

OTHER PUBLICATIONS

Machine translation of DE10237513.*

*Primary Examiner* — Natalie Huls
(74) *Attorney, Agent, or Firm* — Merek, Blackmon & Voorhees, LLC (57) ABSTRACT

A weighing apparatus is disclosed, the apparatus comprising: a container suitable for containing at least one object to be weighed; a supporting frame mechanically coupled to said container for relative movement therebetween and configured to freely support said container; a load cell operable to measure a force exerted on said supporting frame by said container; and a motor apparatus operable to exert a force on said load cell.

15 Claims, 9 Drawing Sheets

(56) References Cited

U.S. PATENT DOCUMENTS

| | | | | |
|---|---|---|---|---|
| 2005/0284670 A1* | 12/2005 | Ikeshima | ............ | G01G 3/1412 |
| | | | | 177/229 |
| 2012/0010840 A1* | 1/2012 | Fankhauser | .......... | G01G 23/012 |
| | | | | 702/101 |
| 2014/0060942 A1* | 3/2014 | Qu | ....................... | G01G 19/083 |
| | | | | 177/136 |
| 2014/0318876 A1* | 10/2014 | Kellams | ............... | G01G 23/005 |
| | | | | 177/45 |
| 2016/0356640 A1* | 12/2016 | Freeman | ................ | G01G 19/52 |

* cited by examiner

Fig. 5

WEIGHTING APPARATUS INCORPORATING A FREELY SUPPORTED CONTAINER

CROSS REFERENCE TO RELATED APPLICATIONS

This application represents the first application for a patent directed towards the invention and the subject matter.

BACKGROUND OF THE INVENTION

1. Field of the Invention

The present invention relates to a weighing apparatus, and more particularly to a laundry weighing apparatus.

2. Description of the Related Art

Commercial and industrial laundry installations typically include a storage container, referred to in the trade as a 'bin', for holding and weighing laundry items during a laundering process. Indeed, a typical installation may include several such bins for holding laundry at various stages of a laundering process.

At least one use of such a bin is for receiving soiled laundry prior to commencement of a laundering process, and for holding the soiled laundry until such time as the laundering process is commenced. Such laundering processes, including the holding of laundry in bins, tends to be automated and controlled by computer controllers, with stages of the laundering process being initiated when a detected condition is met. In the example of a storage bin used for holding soiled laundry prior to commencement of laundering stages, soiled laundry may be offloaded from delivery vehicles into a central storage bin. In some circumstances however, and depending on the particular type of installation, laundering of soiled laundry may be performed in batches, rather than on a continuous basis, and so it may be desirable to hold the soiled laundry in a storage bin until the desired quantity of laundry is present.

The amount of laundry held in a bin is typically measured in one of two ways: by counting of each item deposited, for example, using a light trap (a 'counting' bin); or by measurement of the combined mass of the bin and laundry (a 'weighing bin'). Typically bins of the 'weighing' type include a load cell for measuring the combined mass of the bin and laundry contained therein. Knowing the mass of the bin 'dry', the computer controller may determine the mass, and by inference where appropriate the volume, of the laundry contained therein. When the mass of laundry contained in the bin reaches a threshold value, the computer controller may cause the laundry to be discharged from the bin, typically on to a conveyor belt, by which it is conveyed to later stages of the laundering process.

A problem is encountered in such apparatus of the prior art, in as much that the load cell for measuring the mass of the bin will tend to lose its calibration over time, for example, because of material fatigue of mechanical wear. As a result, the load cell will produce incorrect, unreliable, or otherwise false readings of the mass of the bin. This may result in either under or over filling of the bin, and so under or over loading of machinery performing the laundering process, and so reducing the efficiency with which the laundry is laundered.

To reduce the error in the measured weight of such a bin, conventionally the load cell is calibrated periodically by an operative as a matter of routine machinery maintenance. Typically this will involve exerting a known force on the load cell, for example, by placing an object of known mass on the load cell, and in dependence on the reading produced, determining a correction factor to be applied to the computer controller routines to compensate for the inaccuracy of the sensor. However, such a calibration procedure is complex, time consuming, and due to the typical inaccessibility of such bins in a laundering installation, can be dangerous and unhygienic. Moreover, because of the aforementioned problems experienced with conventional calibration techniques, calibration of conventional bins tends to be performed only relatively rarely, rather than on a continuous basis.

BRIEF SUMMARY OF THE INVENTION

According to a first aspect of the present invention, there is provided a weighing apparatus, the apparatus comprising: a container suitable for containing at least one object to be weighed; a supporting frame movably coupled to said container for relative movement therebetween and configured to freely support said container; a load cell operable to measure a force exerted on said supporting frame by said container; and a motor apparatus operable to exert a force on said load cell.

Preferably said load cell is operable to measure force exerted in a first direction on said supporting frame by said container.

Preferably said motor apparatus is operable to exert a force on said container in said first direction.

Preferably said load cell is mechanically coupled to said supporting frame.

Preferably said apparatus further comprises a bracket member, said bracket member comprising of two parts, a first part being rigidly mechanically coupled to said container and a second part being rigidly mechanically coupled to said supporting frame, the first part being movably mechanically coupled to said second part.

Preferably said load cell comprises a strain gauge load cell.

Preferably said motor comprises an actuator.

Preferably said motor comprises a pneumatic actuator.

Preferably said motor apparatus comprises a pneumatic cylinder.

Preferably said motor apparatus further comprises supply apparatus suitable for supplying air to said pneumatic actuator.

Preferably said supply apparatus is suitable for supplying air to said pneumatic actuator at a pressure greater than atmospheric pressure.

Preferably said supply apparatus comprises an air receiver tank suitable for storing air at a pressure greater than atmospheric pressure.

Preferably said supply apparatus further comprises a solenoid valve.

Preferably said supply apparatus further comprises an air pump suitable for charging said air receiver tank with air.

Preferably said weighing apparatus is configured as a laundry storage container suitable for storing laundry.

BRIEF DESCRIPTION OF THE DRAWINGS

The invention will now be described by way of example only with reference to the accompanying drawings, which are purely schematic and not to scale, of which:

FIGS. 3b, 3c and 3d show in close-up views the motor apparatus previously shown in FIG. 3a;

DETAILED DESCRIPTION OF EXAMPLE EMBODIMENTS

Figure 1:
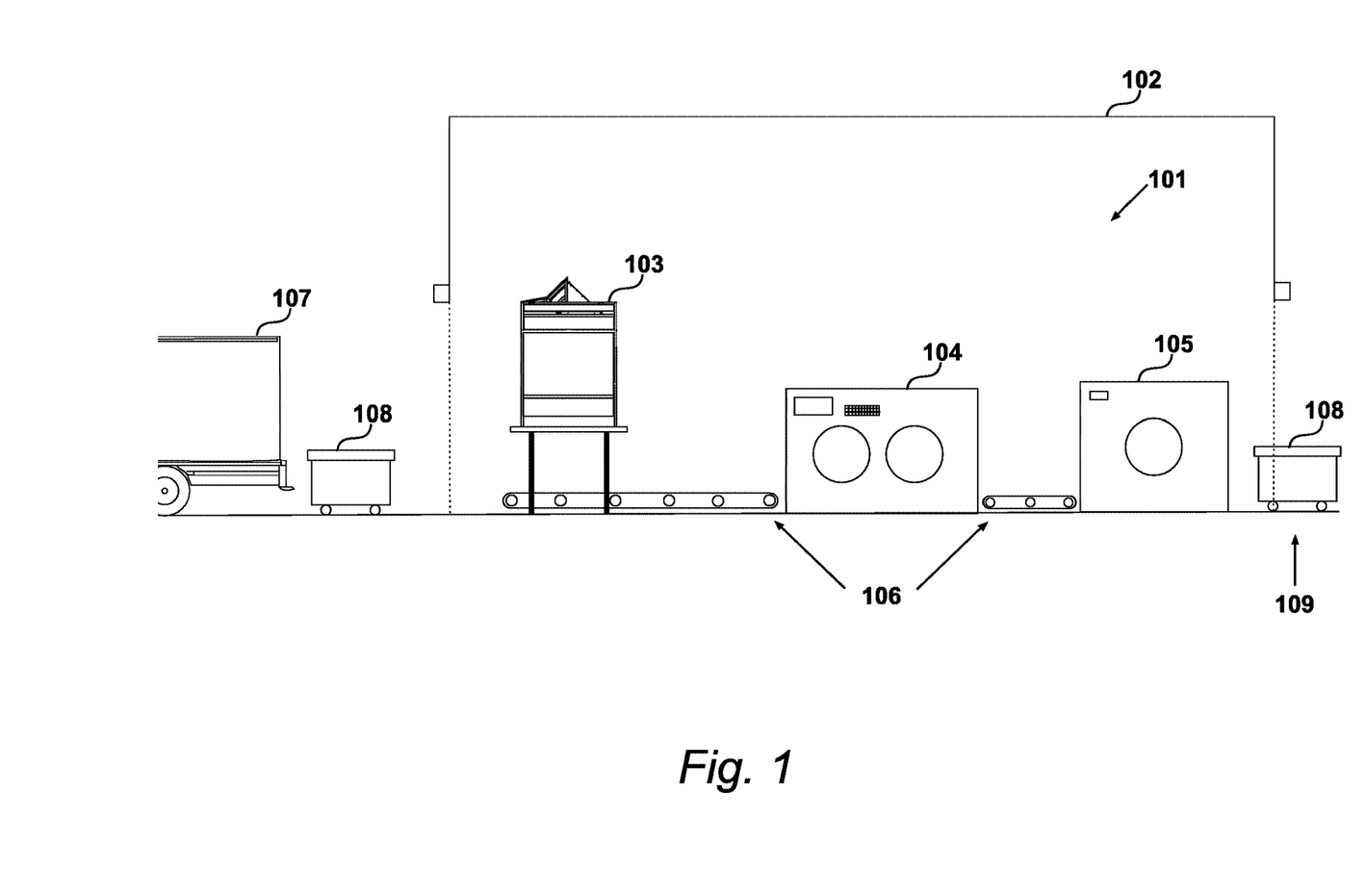
FIG. 1 illustrates an example environment in which a laundry bin according to a specific embodiment of the present invention may be deployed.

FIG. 1

An example of the environment in which a weighing apparatus according to an embodiment of the present invention may be deployed is illustrated in FIG. 1. In the specific embodiment described herein, the weighing apparatus takes the form of a laundry storage container (commonly referred to in the trade as a laundry 'bin').

As illustrated in the Figure, an installation 101 for commercial laundering of laundry typically comprises of a number of machines distributed about a room of a building, each machine performing a distinct stage of a laundering process. It should be noted that FIG. 1 illustrates only select stages of a typical laundering process for the purposes of illustrating an embodiment of the present invention, and those skilled in the art of laundering will be readily able to devise a functional laundering installation.

As shown, in the embodiment the installation indicated generally at 101 is housed in building 102, and comprises of a weighing apparatus 103 embodying an aspect of the present invention (which in the specific embodiment takes the form of a laundry bin), a washing apparatus 104 for washing laundry items, a drying apparatus 105 for drying washed laundry items, and an automated belt conveyor system 106 for conveying laundry between the apparatus 103 to 105. Laundry bin 103 is, in this embodiment, installed on a platform so as to elevate the bin 103 from ground level.

In a way in which the skilled person will be entirely familiar, soiled laundry may tend to arrive at the laundering installation 101 in batches delivered by delivery vehicles, such as delivery vehicle 107, usually in wheeled carts, such as carts 108. In some laundering installations, such as installation 101, it is desirable for laundry to be processed by the apparatus through the various stages of the laundering process in batches, which batches may not be equal in size to the batches in which the laundry is delivered to the installation. Installation 101 therefore includes laundry bin 103 according to an embodiment of the present invention.

Laundry bin 103 has a substantially conventional construction, save as will be described, and comprises one or more containers for holding and weighing items of laundry. Thus, items of soiled laundry may be unloaded from delivery vehicles, and then sorted and deposited into said laundry bin 103. Laundry items may then be stored in laundry bin 103 until the amount of laundry contained therein meets the desired batch size for commencement of the washing stage of the laundering process.

When the amount of laundry contained in laundry bin 103 meets the desired batch size, the items of soiled laundry may be discharged from the bin 103, typically through the base of the apparatus, as will be later described with particular reference to FIG. 2d.

In the example, soiled laundry items are discharged from laundry bin 103 on to automated conveyor belt system 106, which conveys the batch of laundry to washing apparatus 104 for the purposes of performing a washing stage of a laundering process. Following the washing stage, washed laundry items may again be discharged on to conveyor 106 and conveyed to drying apparatus 105, at which stage the washed laundry is dried.

In the example installation illustrated, washed and dried laundry is discharged from drying apparatus 105 in real time to a collection area 109 from which an operative may collect the laundry items.

In an alternative embodiment however, a second laundry bin similar to first laundry bin 103 may be provided at the end of the laundering process, into which laundry from drying apparatus 105 may be discharged, and in which the laundered laundry may be stored until the desired quantity is present. Moreover, it will be readily apparent to the skilled person that laundry bins such as laundry bin 103 might be interposed at various stages of a laundering process for the purpose of holding laundry items until a desired condition is met, for example, in different embodiments, laundry bins such as laundry bin 105 might be interposed between washing and drying apparatus 104, 105 of a laundering installation.

The specific embodiment of the claimed weighing apparatus described herein takes the form of a laundry container (laundry 'bin' 103). It will of course be appreciated by the skilled person however that weighing apparatus according to the present invention may take an alternative form. Indeed, in an alternative embodiment, weighing apparatus according to the present invention might take the form of an apparatus for weighing grocery goods, or for storing, weighing and dispensing particulate material. Indeed, in its broadest embodiment, the utility of the invention is not limited to its use as a laundry bin, and a number of different forms of the invention are envisaged by the applicant.

FIGS. 2a, 2b, 2c & 2d

Figure 2A:
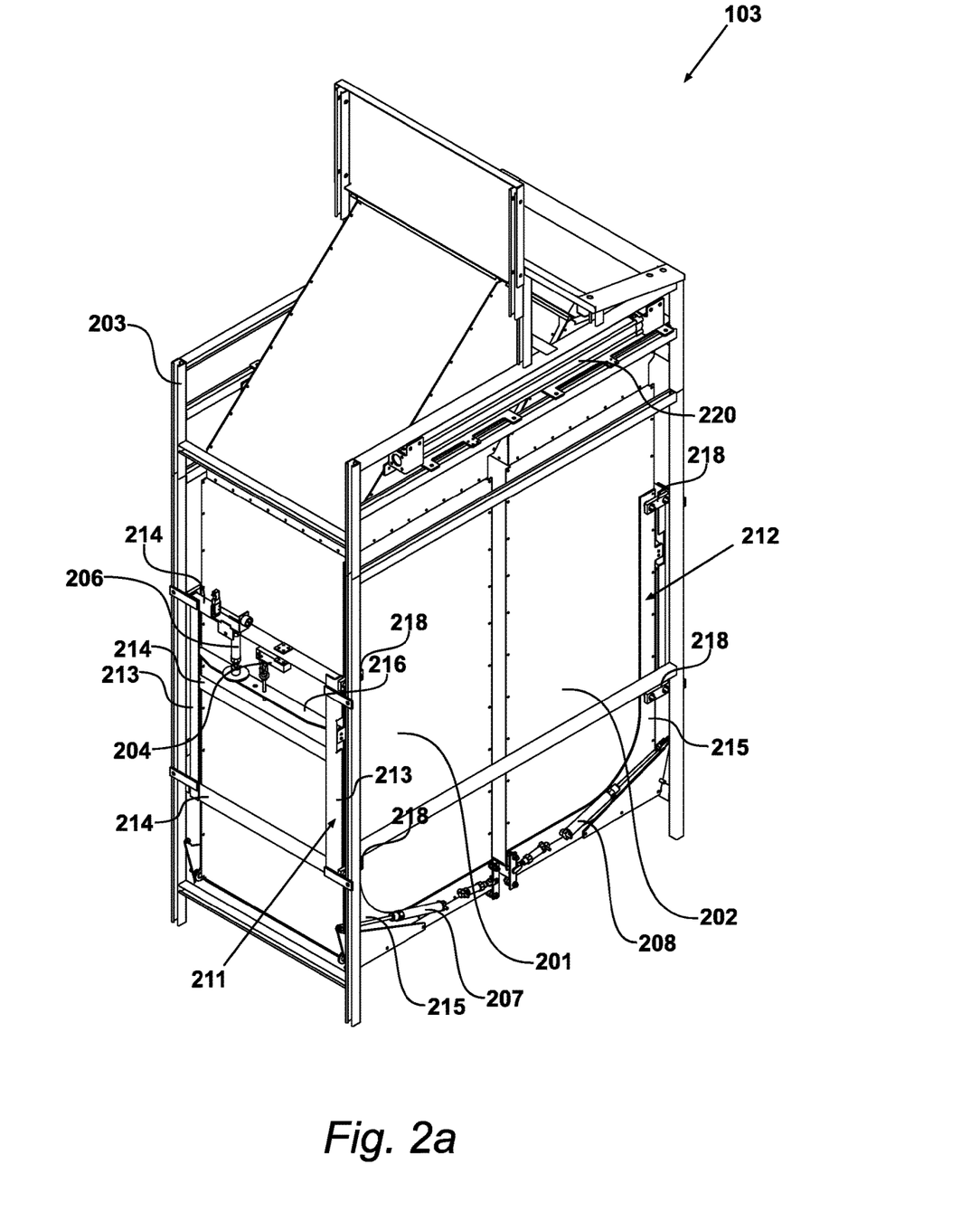
FIG. 2a shows in a perspective view the laundry bin identified in FIG. 1.
Figure 2B:
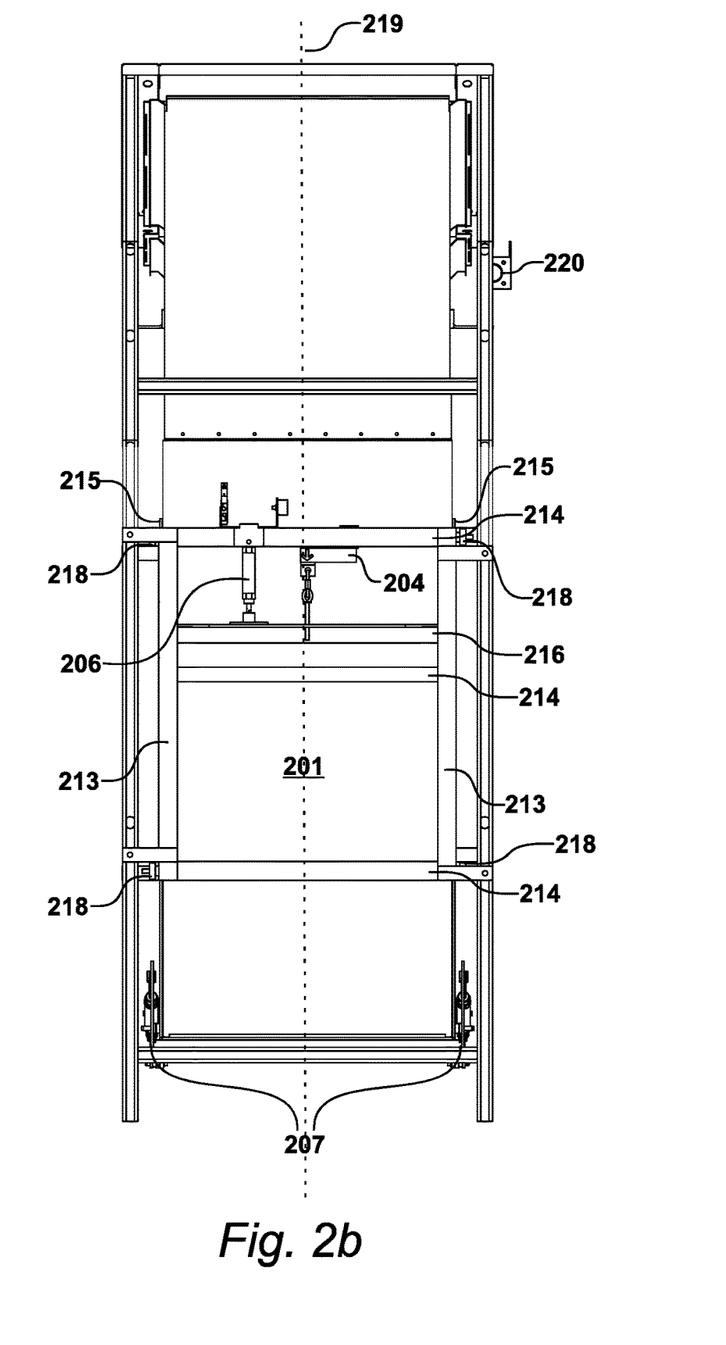
FIG. 2b shows a front elevation view of the laundry bin.
Figure 2C:
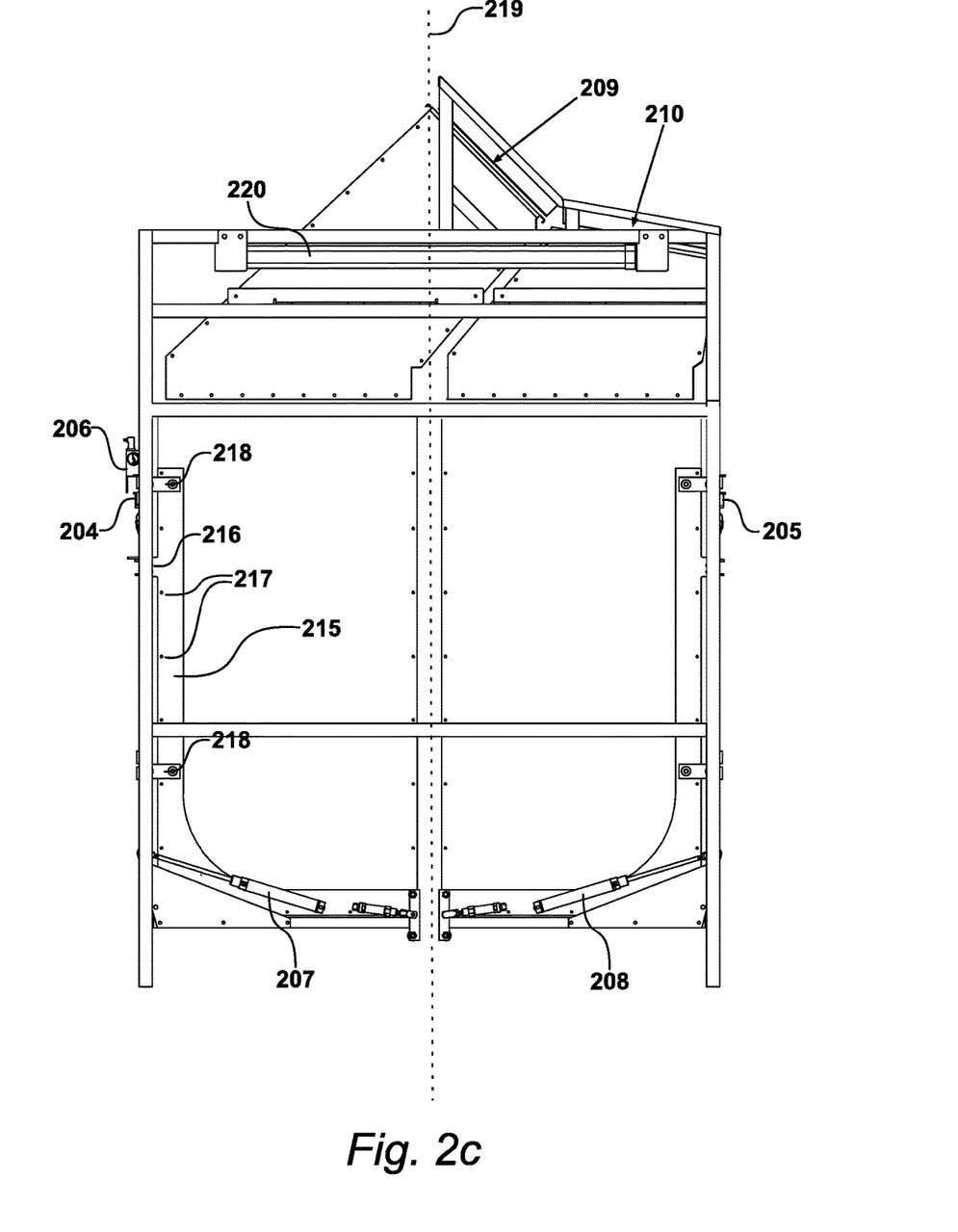
FIG. 2c shows a side elevation view of the laundry bin.
Figure 2D:
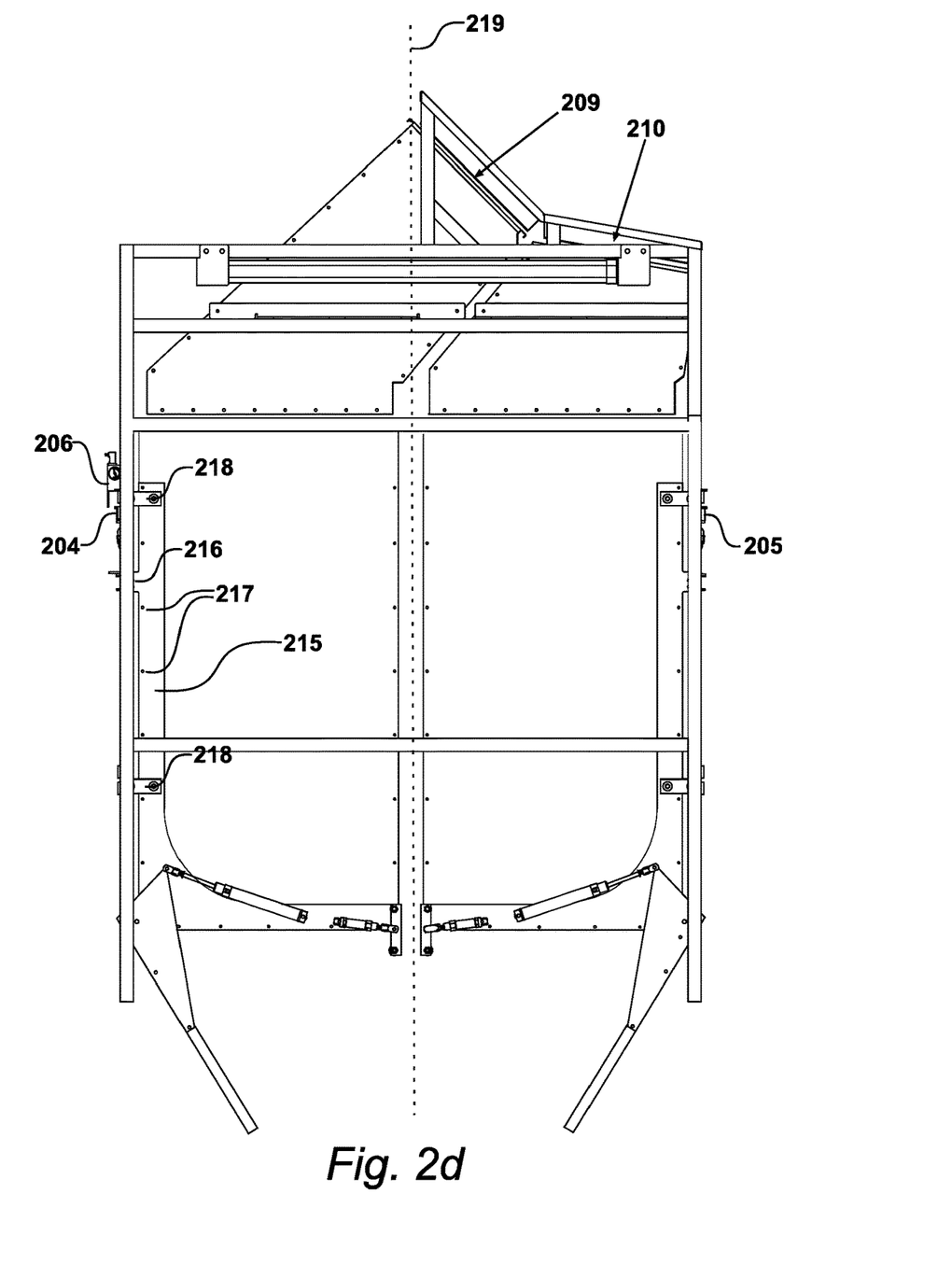
FIG. 2d shows a second side elevation view of the laundry bin.

The weighing apparatus 103 shown previously in FIG. 1 is shown with its outer casing removed in a perspective view in FIG. 2a, a front elevation view in FIG. 2b and a side elevation view in FIG. 2c, and in a second side elevation view in FIG. 2d.

Referring to the Figures, laundry bin 103 comprises generally of a pair of containers 201 and 202, each of which is suitable for containing items of laundry such as clothing garments, a supporting frame 203 for supporting the containers 201, 202 clear of a ground surface on which the apparatus is installed, first and second load cells 204, 205 operable to measure the force exerted on the frame 203 by each of the containers 201, 202, and a motor apparatus 206 operable to exert a force on said load cell 204. The containers 201, 202 are substantially identical in construction save as will be described. Each container comprises generally of four upwardly extending side walls and a base hingedly connected to one of the side walls.

As described previously with reference to FIG. 1, in an embodiment, it is desirable for containers 201, 202 to discharge their contents through their base, for example, on to a conveyor belt. Thus, in the embodiment, the base of each container is hingedly connected to a respective side wall, and actuators 207, 208, are provided operable to actuate the bases of containers 201, 202 respectively, between their respective closed positions (shown in FIGS. 2a to 2c), and respective open positions (shown in FIG. 2d).

The top end of each container 201, 202 defines an opening 209, 210 to allow loading of laundry items into the container. In the specific embodiment, laundry bin 103 is configured as a sorting bin, in which each of containers 201, 202 may be loaded with different categories of laundry items, for example, depending on the material from which the laundry item is constructed.

Laundry bin 103 further comprises a supporting frame, indicated generally at 203, which comprises generally of four upright posts positioned at each corner, and a plurality of horizontal cross members extending therebetween, the supporting frame 203 being configured to support the containers 201, 202 clear of external of objects, such as the platform and ground surface on which the bin 103 is installed, so that the mass of each of containers 201, 202 is carried by the supporting frame 203. More preferably, the supporting frame 203 is configured to carry the whole of the mass of the containers 201, 202.

In the embodiment, containers 201, 202 are coupled to said supporting frame 203 by way of like brackets 211, 212. Each bracket 211, 212 is formed generally in two parts. A first part comprises generally of a pair of uprights 213 joined by cross members 214, which uprights and cross members are rigidly fixed to the uprights of the supporting frame 203. A second part of brackets 211, 212 comprises generally of a pair of mounting plates 215 rigidly attached to the side walls of the respective container, and includes a cross member 216 rigidly attached to, and extending between, the mounting plates 215.

The coupling of said bracket 211 to said container 201, is substantially identical to the coupling of said bracket 212 to said container 202. Similarly, the coupling of said bracket 211 to said supporting frame 203 is substantially identical to the coupling of said bracket 212 to said supporting frame 203. For reasons of simplicity then, the coupling of bracket 211 to container 201 and frame 203 will be described in detail, with the understanding that the coupling of like bracket 212 to like container 202 and supporting frame 203 is substantially identical.

As illustrated, in the embodiment, said second part of bracket 211 is rigidly coupled to container 201 by rivets 217, which pass through the mounting plates 215 and engage the container 201, but in an alternative embodiment could be coupled by other conventional attachment means, for example, by bolts, adhesive or welding, to prevent relative movement therebetween. The second part of the bracket, rigidly mechanically coupled to the container 201, is in turn movably mechanically coupled to said uprights 213 of the first part of the bracket by way of coupling links 218, which links are each pivotally attached at either end to said first and second parts of bracket 211, and allow relative movement therebetween, generally parallel to the axis 219.

Thus, in this way, containers 201 and 202, are each movably coupled to the supporting frame 203 by brackets 211, 212, with a small amount of movement allowed relative to frame 203, generally upwardly and downwardly along axis 218, thereby exerting a force on load cells attached to said supporting frame by the movement of the containers 201, 202, as will be described in further detail. The supporting frame 203 is configured to be fixed securely to an immovable object, such as the ground surface as illustrated in FIG. 1, so as to secure the apparatus in position. The movable coupling between the brackets 211, 212 and supporting frame 203 then allows relative movement between the containers 201, 202 and the frame 203, as will be described, thereby allowing measurement of the mass of the containers by load cells mounted to the supporting frame 203.

In the specific embodiment, said laundry bin 103 comprises two containers, containers 201, 202, for containing laundry items, and may thus be used as a 'sorting' bin, with laundry items being graded and allocated to the appropriate container. In the embodiment, and as described previously, containers 201 and 202 function independently of the other, and include individual load cells 204, 205, each load cell operable to measure the mass of its respective container. Moreover, in the embodiment, actuators 207, 208 may be operated independently, so as to allow discharging of laundry from the containers independent of the other container. Referring particularly to FIG. 2d, the containers 201, 202 are each shown in their discharging conditions, in which the base of each container has been hinged open by activation of actuators 207, 208, thereby allowing discharging of laundry from the containers.

As will be described however, in the embodiment, although apparatus 103 comprises two load cells 204, 205, to allow separate measurement of the mass of each container 201, 202, the apparatus comprises only a single motor apparatus 206 in this case a pneumatic cylinder, which is operable when supplied with pressurised air to engage bracket 211 to exert a force on said load cell 204. Thus, in the specific embodiment, only load cell 204, operable to measure the mass of container 201, may be calibrated in the manner described with reference to FIGS. 4 and 5. In alternative embodiments however, it will of course be appreciated that separate motor apparatus may be provided operable to exert a force on said load cell 205 to allow its calibration.

As will be described further with reference to FIGS. 3a to 3d, in the embodiment, laundry bin 103 is further provided with an on board air receiver tank x, operable to store air at above atmospheric pressure for supply to said pneumatic cylinder 206.

Moreover, it will of course be appreciated by the skilled person that in an alternative (simpler) embodiment of the invention, the apparatus 103 may comprise only a single container 201, in which case only a single load cell 204 may be required. Further the skilled person will appreciate that a laundry bin according to an aspect of the present invention may comprise more than two individual containers such as container 201, 202.

FIGS. 3a, 3b, 3c and 3d

Figure 3A:
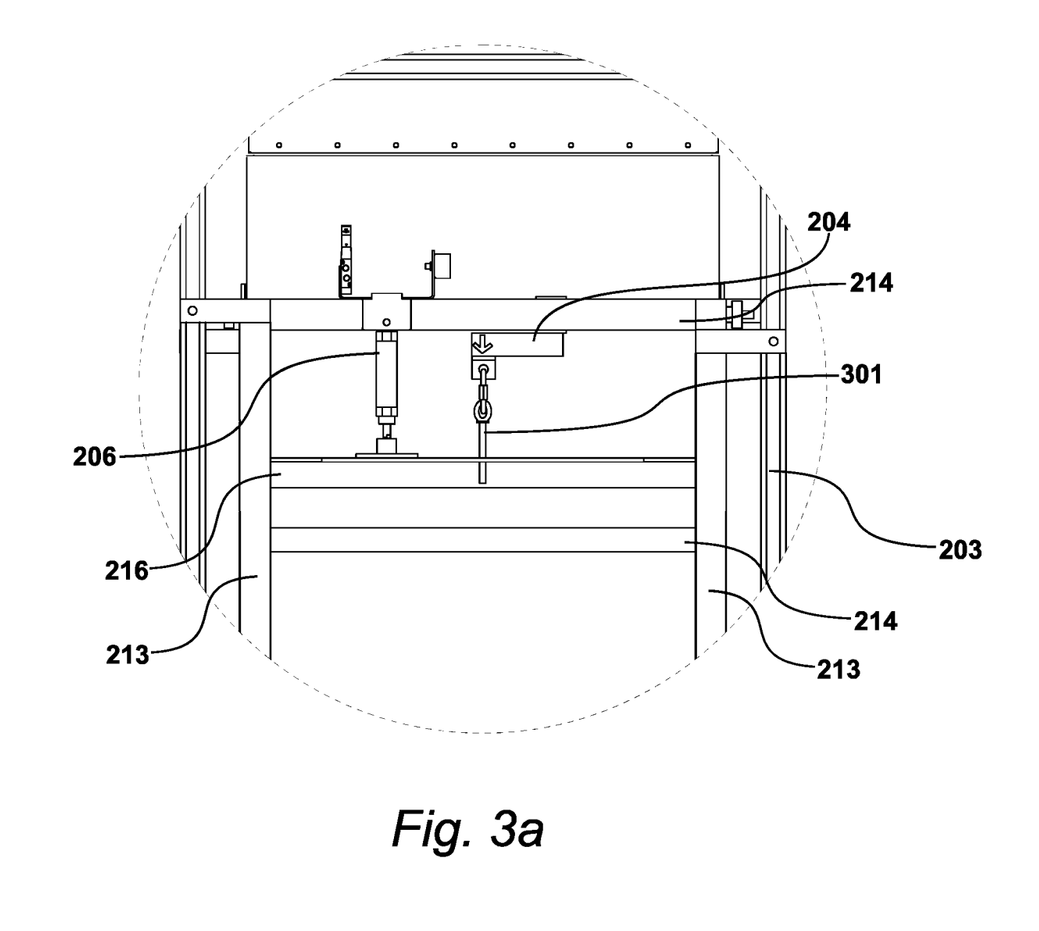
FIG. 3a shows a close-up view of a load cell and a motor apparatus shown in FIGS. 2a to 2c.

FIG. 3a shows a close-up view of load cell 204 and motor apparatus 206 identified previously with reference to FIG. 2a. Motor apparatus 206 is shown in further close up views in FIGS. 3b, 3c and 3d.

As previously described, said containers 201, 202 are movably coupled to frame 203 so as to be freely supported by the frame 203, i.e. to be supported clear of external objects, such as a ground surface, and more preferably such that the frame 203 supports substantially the whole of the mass of the containers 201, 202. The containers 201, 202 are thus effectively 'floating' with respect to the frame 203, and may move upwardly and downwardly a small distance generally parallel to axis 218, joined to the frame by links 218. For the reasons described previously, it is often necessary to determine the mass of the containers 201, 202, so as to allow determination of the mass of objects, such as laundry items, contained therein.

Referring to the Figures then, apparatus 103 is provided with a first load cell device 204, which serves to support the container 201, at a position between the upper and lower extremities of its movement along axis 218. The load cell is operable, in the manner described with reference to FIG. 4, to measure the force exerted on the frame 203 by the container 201, thereby allowing determination of the mass of the container 201 and inference of the mass of laundry contained therein.

In the embodiment, load cell 204 is coupled to a cross member 214 of the first part of bracket 211, which first part of bracket 211 is rigidly coupled to the uprights of said supporting frame 203, and is coupled to cross member 216 of the second part of bracket 211 by way of adjustable length linkage 301, which second part of bracket 211 is rigidly coupled to said container 201. In this way, load cell 204 serves to carry the mass of the container 201, i.e. by transmitting the downward force caused by the force of gravity acting on the mass of the container 201, to the cross member 214 of bracket 211 which is rigidly coupled to the supporting frame 203. This essentially two part construction of weighing apparatus 103, i.e. the containers 201, 202 being movable with respect to the supporting frame, allows the mass of the containers to be measured by a load cell mounted to the supporting frame.

In the specific embodiment illustrated, said load cell 204 comprises a strain gauge load cell, the change in resistance of which provides an electrical value change indicative of the load, and so the mass of the container 201. Thus, strain gauge 204 is coupled to said supporting frame 203 by way of cross member 214 of first part of bracket 211, and coupled to said container 201 by way of cross member 216 of the second part of bracket 211 bracket 211, and measures the downward force exerted on said supporting frame 203 by the mass of container 201 acted on by gravity.

As will be understood, the force of gravity acting on the container 201 and its contents will tend to pull the container downwardly relative to the supporting frame 203 generally parallel to the axis 218. This downward movement of the container 201 strains the strain gauge 204 in an amount dependent on the mass of the container and its contents, allowing the mass of the container and contents to be measured by observing the change in electrical resistance of the strain gauge. The change in resistance of the strain gauge may be monitored by a computer control system, such as that which will be described later with particular reference to FIG. 4. Load cell 205 is similarly attached to supporting frame 203 and container 202, and is operable to measure the mass of container 202 in a similar manner.

Figure 3B:
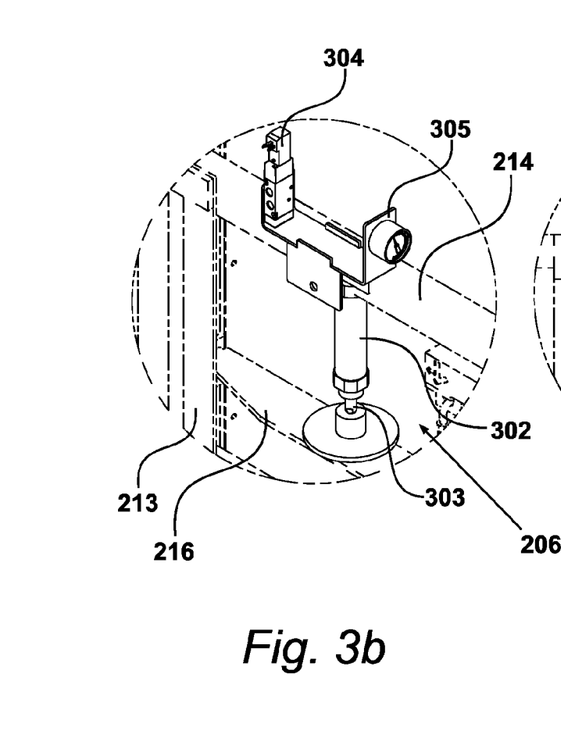
Figure 3C:
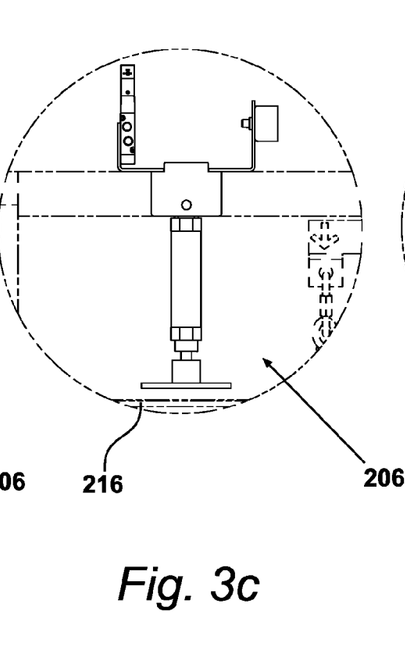
Figure 3D:
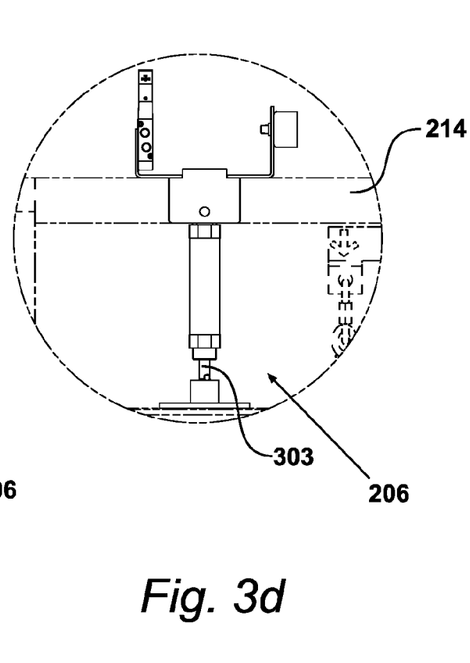

Referring particularly to FIGS. 3b, 3c and 3d, motor apparatus 206 operable to exert a force on said strain gauge 204 to allow its calibration, is shown in detail. As discussed previously, it is known for load cells such as strain gauges 204, 205 to lose their calibration over time, inasmuch that their response, in this case electrical response, to an applied load may change. This deviation from linearity with respect to time may be due to material fatigue or degradation of the load cell. With load cells of almost any type, it is therefore often necessary to perform regular calibration procedures, so as to allow the response of the load cell to an applied load to be correctly characterised. In the example of the strain gauge 204, it may be necessary at regular intervals to characterise the electrical resistance as a function of load of the strain gauge. As will be appreciated, this requires application of a known load to the load cell.

Thus, as will be described, motor apparatus 206 is operable to exert a predetermined force on strain gauge 204. In the specific embodiment illustrated, motor apparatus 206 comprises a pneumatic cylinder, more specifically a single acting (spring loaded) pneumatic cylinder. The main body 302 of the pneumatic cylinder is attached to said cross member 214, which is in turn rigidly attached to supporting frame 203, and the motor apparatus is operable such that its piston 303 engages the cross member 216, which is in turn rigidly attached to container 201, exerting a downward force on the cross member 216 (generally parallel to axis 219), and so indirectly on container 201 and load cell 204.

Pneumatic cylinder 206 is shown in FIGS. 3b and 3c in the retracted condition in which no force is exerted on the cross member 216, and in the extended condition in FIG. 3d, in which the piston exerts a force on the cross member 216. As will be appreciated, the force exerted on said cross member 216 by said pneumatic cylinder 206 loads said strain gauge 204 with the same force.

In the embodiment, motor apparatus 206 further comprises a supply apparatus, which generally comprises of air receiver tank 220 operable to store air at a pressure greater than atmospheric pressure, a solenoid valve 304 configured to control the supply of air to the main body 302, a pressure regulator 305, and associated supply pipework (not shown). In the conventional manner, an air pump (not shown) may be used to charge said air receiver tank 220 with air to the desired pressure. In use, pressurised air held in air receiver tank 220 may be supplied to pneumatic cylinder 206, via solenoid valve 204 under the control of a computer control system, to increase the pressure within the cylinder to the required value (as set by the pressure regulator) to cause the piston to exert the required force on the cross member 216

It will of course be appreciated by the skilled person that although the invention is described herein as including a strain gauge as a load cell, and a pneumatic cylinder as a motor apparatus, alternative devices are available. It will be understood that the function of load cells 204, 205 is to allow measurement of the mass of containers 201, 202, which fundamentally requires measurement of a force, and as such a number of alternative devices to strain gauges may be used.

For example, as an alternative to a strain gauge, load cells 204, 205 may comprise a piezoelectric load cell, in which the voltage output of a piezoelectric material depends on the load, or as further alternatives, hydraulic or pneumatic load cells, in which the pressure of a working fluid in a cylinder depends on the load applied to a piston. Moreover, as an alternative to the pneumatic cylinder shown, motor apparatus 206 may alternatively take the form of, for example, a hydraulic cylinder, a hydraulic or pneumatic rotary motor, or even an electric linear or rotary motor, the fundamental requirement being that the motor apparatus operable to exert a force on the load cell.

It will of course be understood by the skilled person that the motor apparatus should be selected dependent on the magnitude of force required for calibration of the load cell. For example, it has been determined by the present applicant that a pneumatic cylinder having a bore of approximately 40 millimeter, may be operated to exert a force of approximately 450 Newton on the load cell by supply of air at a pressure of approximately 354 kilopascal. Further, it has been determined by the applicant that the same force may be exerted using a cylinder having a bore of approximately 32 millimeter supplied with air at a pressure of approximately 553 kilopascal.

Moreover, it will be appreciated by the skilled person that although in the embodiment illustrated, each laundry bin such as laundry bin 103 is provided with an individual air receiver tank 220 attached to supporting frame 203, in alternative embodiments, multiple laundry bins 103 may share air supply from a single air receiver tank.

Figure 4:
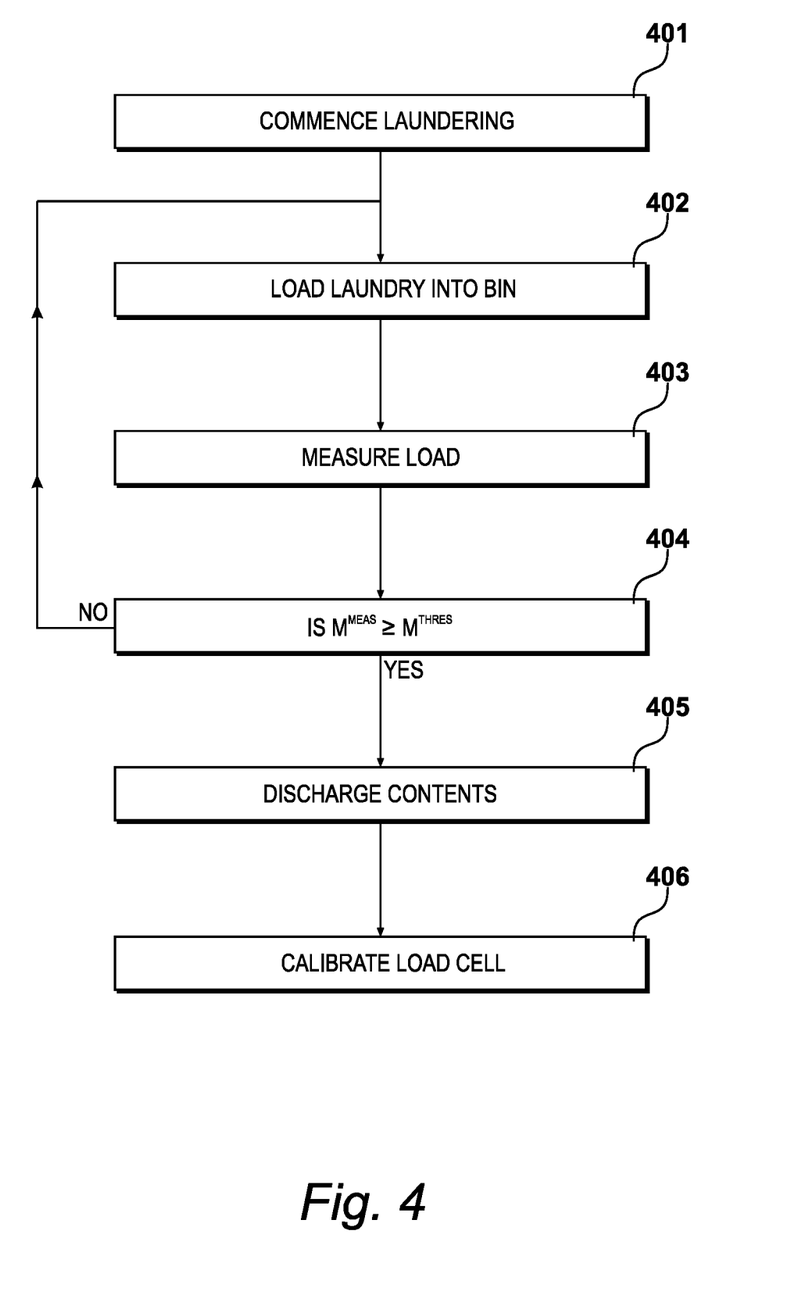
FIG. 4 shows an overview of procedures undertaken by a computer control system used to control the operation of the laundry bin identified in preceding Figures.

FIG. 4

An overview of procedures undertaken by a computer control system used to control the operation of laundry bin 103 is shown in FIG. 4. In the embodiment, a programmable logic controller (PLC) is used to control the operation of the laundry bin.

At step 401 a user is prompted to initiate operation of the laundering process. Appreciating that a single computer controller may be used to control a number of laundry bins such as bin 103, step 401 may further involve selection of the laundry bin(s) to be operated.

At step 402 the laundry bin is ready for operation and may be loaded with laundry items.

At step 403, the mass of the containers and contents is measured. In the case of laundry bin 103 which includes multiple containers, steps 403 to 405 would be performed for each container. Thus, turning firstly to container 201, at step 403 the mass of container 201 is measured by measuring the electrical resistance of strain gauge 204.

At step 404 a question is asked as to whether the mass of the container 201 measured by the strain gauge 204 ($M^{MEAS}$) of the containers and contents meets or exceeds a threshold value for the mass at which laundering should commence ($M^{THRES}$).

If this question asked at step 404 is answered in the negative, control returns to step 402 and further items of laundry may be sorted into the container. If the question is answered in the affirmative, it is determined that the required amount of laundry is contained in the container, and the contents are discharged from the container at step 405 by allowing the base of the container to open (to the open condition shown in FIG. 2d).

Following steps 401 to 405, a calibration procedure may performed by the PLC at step 406 to calibrate the response characteristics of load cell 204. In certain embodiments, calibration step 406 may be commenced by the PLC controller following each cycle of steps 401 to 405. In the alternative, calibration step 406 may be performed only as a matter of routine maintenance.

Figure 5:
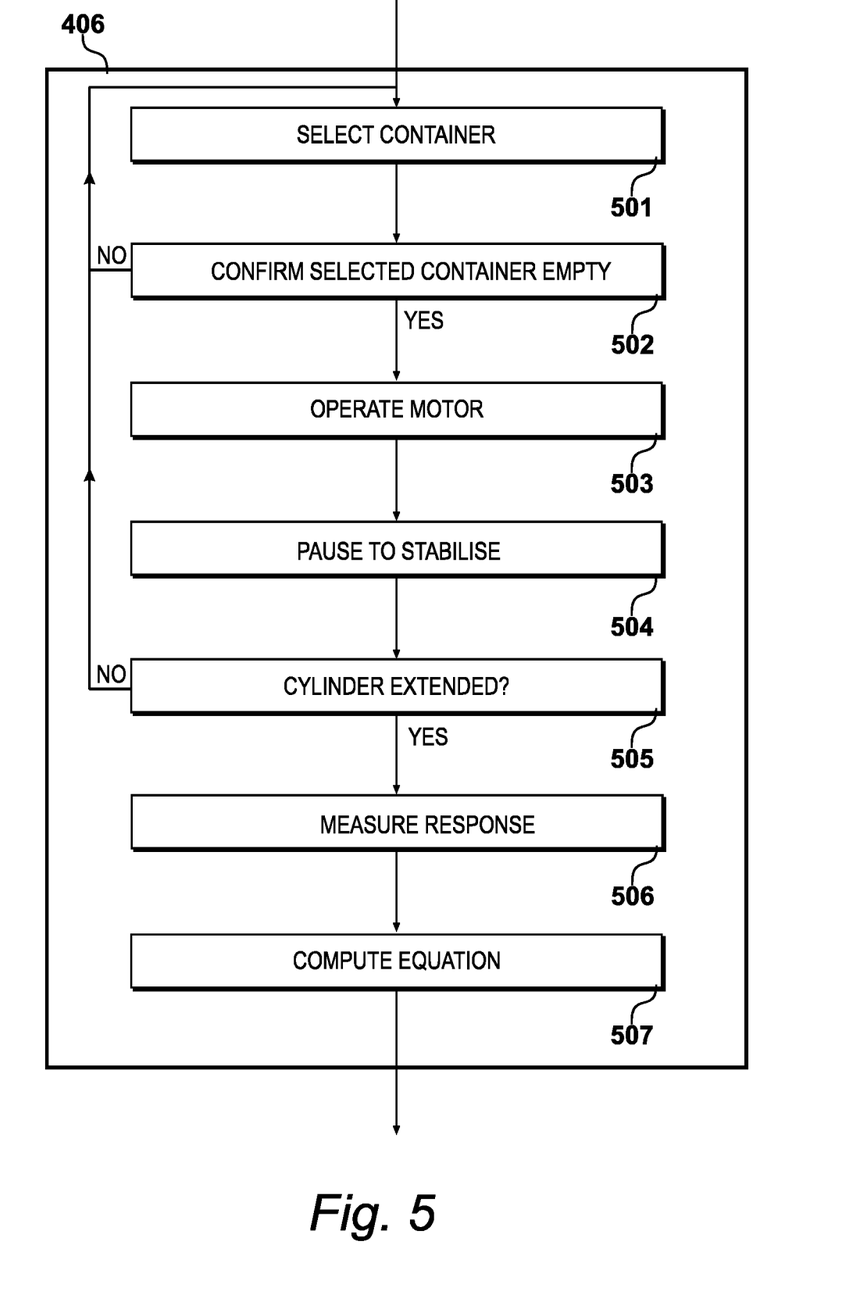
FIG. 5 shows step 406, in which the response of the load cell is calibrated.

FIG. 5

Step 406, in which the response of the load cell sensor 204 is calibrated, is detailed in FIG. 5.

At step 501 a user is asked to select a single container for calibration. In the specific embodiment of the laundry bin 103 illustrated, only load cell 204 corresponding to container 201 may be calibrated.

At step 502, the user is prompted to confirm that the selected container is empty, that is does not contain any laundry items. If this questioned is answered in the negative, the calibration procedure is aborted and control returns to step 501. If answered in the affirmative, the PLC controller sets the load measured by the load cell 204 (loaded by the container 'dry') as a zero reference.

At step 503 solenoid valve 304 of the supply apparatus is operated to supply a computed volume of pressurised air from the air receiver tank to pneumatic cylinder 206, thereby causing piston 303 to extend and exert a known force on said load cell 204 in dependence on the pressure of air supplied to the cylinder and the cylinder bore dimension.

At step 504, following charging of the pneumatic cylinder 206 with air from receiver tank, solenoid valve 304 is closed and piston 303 is held in the extended position for a defined period of time to allow the system to stabilise.

At step 505 a question is asked as to whether the cylinder has extended correctly. In embodiments, the cylinder may be self-reporting, and may include secondary sensors to monitor correct extension. As an alternative, the user may be prompted to manually observe and confirm correct extension of the cylinder. In the preferred embodiment however, PLC controller takes a reading of the resistance of load cell 204 at step 505 and compares the reading to a resistance range stored to memory. If the measured value of resistance falls within the range, it may be assumed that the cylinder has deployed correctly. If this question is answered in the negative, i.e. a determination is made that the cylinder has not deployed correctly, the procedure is aborted and control returns to step 501.

If the question at step 505 is answered in the affirmative, at step 506 the programmable logic controller measures the electrical response of the strain gauge 204, and stores the resistance value to memory.

At step 507, the programmable logic controller computes an equation relating the electrical resistance characteristics of the strain gauge 204 to the load applied thereto, and stores the equation to memory. The solenoid valve 304 is opened to vent the air from the pneumatic cylinder 206 (either to atmosphere or back to said air receiver tank) causing the piston 303 of cylinder 206 to return to the retracted position under the force of an internal spring, and control is then returned to step 401.

As has been described, in the embodiment, although apparatus 103 includes two like load cells 204, 205, for measurement of the mass of containers 201, 202, respectively, only a single motor apparatus 206 is provided, operable to exert a force only on load cell 204. Thus, in the present embodiment, only the response of load cell 204 may be calibrated. For practical purposes, assuming that load cells 204 and 205 are like, i.e. of the same type, condition and age, the response of load cell 204, as determined by calibration, may be assumed to be the same as the response of 205. Of course, in alternative embodiments, and particularly in embodiments where load cells 204, 205 are not like, laundry bin 103 may comprise two sets of motor apparatus 206, each motor apparatus being operable to exert a force on either load cell 204 or 205. In this way, both load cell 204 and load cell 205 may be calibrated using the described method.

What I claim is:

1. A weighing apparatus, the apparatus comprising:
   a container suitable for containing at least one object to be weighed;
   a supporting frame movably coupled to said container for relative movement therebetween and configured to freely support said container;
   a load cell operable to measure a force exerted on said supporting frame by said container;
   a motor apparatus operable to exert a force on said load cell, said motor apparatus being disposed relative to said load cell in at least one of the following manners: (i) at least a portion of said load cell is horizontally aligned with at least a portion of said motor apparatus, and (ii) at least a portion of said motor apparatus extends below a lowermost portion of said load cell; and,
   a bracket member having a first part coupled to said container and a second part coupled to said supporting frame, wherein said motor apparatus is operable to exert a force on said load cell in a first direction via said bracket member.

2. A weighing apparatus, the apparatus comprising:
   a container suitable for containing at least one object to be weighed;

a supporting frame movably coupled to said container for relative movement therebetween and configured to freely support said container;

a load cell operable to measure a force exerted on said supporting frame by said container; and a motor apparatus operable to exert a force on said load cell, wherein said weighing apparatus further comprises a bracket member, said bracket member comprising of two parts, a first part being rigidly mechanically coupled to said container and a second part being rigidly mechanically coupled to said supporting frame, the first part being movably mechanically coupled to said second part; wherein said motor apparatus is operable to exert a force on said load cell in a first direction via said bracket member.

3. The apparatus of claim 2, in which said load cell is operable to measure force exerted in the first direction on said supporting frame by said container.

4. The apparatus of claim 3, in which said motor apparatus is operable to exert a force on said container in said first direction.

5. The apparatus of claim 4, in which said load cell is mechanically coupled to said supporting frame.

6. The apparatus of claim 2, in which said load cell comprises a strain gauge load cell.

7. The apparatus of claim 6, in which said motor comprises an actuator.

8. The apparatus of claim 7, in which said motor comprises a pneumatic actuator.

9. The apparatus of claim 8, in which said motor comprises a pneumatic cylinder.

10. The apparatus of claim 9, further comprising supply apparatus suitable for supplying air to said pneumatic actuator.

11. The apparatus of claim 10, in which said supply apparatus is suitable for supplying air to said pneumatic actuator at a pressure greater than atmospheric pressure.

12. The apparatus of claim 11, in which said supply apparatus comprises an air receiver tank suitable for storing air at a pressure greater than atmospheric pressure.

13. The apparatus of claim 12, in which said supply apparatus further comprises a solenoid valve.

14. The apparatus of claim 13, in which said supply apparatus further comprises an air pump suitable for charging said air receiver tank with air.

15. The apparatus of claim 14, in which said weighing apparatus is configured as a laundry storage container suitable for storing laundry.

* * * * *